US010784751B2

(12) United States Patent
Oketani et al.

(10) Patent No.: US 10,784,751 B2
(45) Date of Patent: Sep. 22, 2020

(54) STATOR, MOTOR, BLOWER, VACUUM CLEANER, AND METHOD FOR ATTACHING HALL EFFECT SENSOR

(71) Applicants: Mitsubishi Electric Corporation, Tokyo (JP); Mitsubishi Electric Home Appliance Co., Ltd., Saitama (JP)

(72) Inventors: Naohiro Oketani, Tokyo (JP); Mitsumasa Hamazaki, Saitama (JP)

(73) Assignees: Mitsubishi Electric Corporation, Tokyo (JP); Mitsubishi Electric Home Appliance Co., Ltd., Saitama (JP)

(*) Notice: Subject to any disclaimer, the term of this patent is extended or adjusted under 35 U.S.C. 154(b) by 133 days.

(21) Appl. No.: 16/071,940

(22) PCT Filed: Apr. 8, 2016

(86) PCT No.: PCT/JP2016/061564
§ 371 (c)(1),
(2) Date: Jul. 23, 2018

(87) PCT Pub. No.: WO2017/175387
PCT Pub. Date: Oct. 12, 2017

(65) Prior Publication Data
US 2019/0036423 A1  Jan. 31, 2019

(51) Int. Cl.
*H02K 11/215* (2016.01)
*H02K 1/14* (2006.01)
(Continued)

(52) U.S. Cl.
CPC .............. *H02K 11/215* (2016.01); *A47L 5/22* (2013.01); *H02K 1/148* (2013.01); *H02K 1/185* (2013.01);
(Continued)

(58) Field of Classification Search
CPC ...... A47L 5/22; H02K 11/215; H02K 15/022; H02K 15/10; H02K 1/148; H02K 1/185;
(Continued)

(56) References Cited

U.S. PATENT DOCUMENTS 6,005,320 A * 12/1999 Kim ....................... H02K 21/24
310/114
2002/0149281 A1* 10/2002 Saint-Michel ......... H02K 1/141
310/179

(Continued)

FOREIGN PATENT DOCUMENTS

JP         S62-57576 U     4/1987
JP         S62-168784 U   10/1987
(Continued)

OTHER PUBLICATIONS

International Search Report of the International Searching Authority dated Jul. 12, 2016 for the corresponding international application No. PCT/JP2016/061564 (and English translation).
(Continued)

*Primary Examiner* — Marc Carlson
(74) *Attorney, Agent, or Firm* — Posz Law Group, PLC

(57) ABSTRACT

A stator includes a first split core having a first yoke part extending in a circumferential direction about an axis line and a first tooth extending from the first yoke part toward the axis line, a second split core having a second yoke part extending in the circumferential direction and a second tooth extending from the second yoke part toward the axis line, a first insulator arranged to surround the first tooth and having a first holding part located between a tip end part of the first tooth and a tip end part of the second tooth, a second insulator arranged to surround the second tooth and having a second holding part located between the tip end part of the first tooth and the tip end part of the second tooth, and a Hall effect sensor held by the first holding part and the second holding part.

13 Claims, 13 Drawing Sheets

(51) Int. Cl.
*H02K 1/18* (2006.01)
*H02K 1/27* (2006.01)
*H02K 7/08* (2006.01)
*H02K 7/14* (2006.01)
*H02K 21/16* (2006.01)
*H02K 15/02* (2006.01)
*H02K 15/10* (2006.01)
*A47L 5/22* (2006.01)

(52) U.S. Cl.
CPC ........... *H02K 1/2753* (2013.01); *H02K 7/083* (2013.01); *H02K 7/14* (2013.01); *H02K 15/022* (2013.01); *H02K 15/10* (2013.01); *H02K 21/16* (2013.01)

(58) Field of Classification Search
CPC ...... H02K 1/2753; H02K 21/16; H02K 7/083; H02K 7/14
See application file for complete search history.

(56) References Cited

U.S. PATENT DOCUMENTS

| | | | | |
|---|---|---|---|---|
| 2003/0034699 | A1* | 2/2003 | Selewski | A47L 9/188 310/50 |
| 2005/0099072 | A1 | 5/2005 | Fujii et al. | |
| 2005/0127902 | A1* | 6/2005 | Sogge | G01D 3/08 324/207.2 |
| 2005/0127903 | A1* | 6/2005 | Sogge | G01D 3/08 324/207.2 |
| 2013/0249330 | A1 | 9/2013 | King et al. | |
| 2015/0346292 | A1* | 12/2015 | Wang | H02K 3/522 324/207.2 |

FOREIGN PATENT DOCUMENTS

| | | |
|---|---|---|
| JP | S62-230345 A | 10/1987 |
| JP | H04-196369 A | 7/1992 |
| JP | H04-289759 A | 10/1992 |
| JP | H08-308181 A | 11/1996 |
| JP | 2013-201893 A | 10/2013 |
| KR | 20-0284488 B1 | 7/2002 |
| KR | 20-0284488 B1 | 8/2002 |
| KR | 10-2005-0035079 A | 4/2005 |
| KR | 101022389 B1 * | 3/2011 ............. H02K 1/148 |
| KR | 20-0464228 B1 | 12/2012 |
| KR | 20-0464288 B1 | 12/2012 |
| KR | 200464228 Y1 * | 12/2012 |

OTHER PUBLICATIONS

Office Action dated Sep. 2, 2019 issued in corresponding KR patent application No. 10-2018-7023763 (and English translation).

* cited by examiner

STATOR, MOTOR, BLOWER, VACUUM CLEANER, AND METHOD FOR ATTACHING HALL EFFECT SENSOR

CROSS REFERENCE TO RELATED APPLICATION

This application is a U.S. national stage application of International Patent Application No. PCT/JP2016/061564 filed on Apr. 8, 2016, the disclosure of which is incorporated herein by reference.

TECHNICAL FIELD

The present invention relates to a stator, a motor, a blower, a vacuum cleaner, and a method for attaching a Hall effect sensor.

BACKGROUND

Conventionally, there are known motors of an inner rotor type having a permanent magnet attached to a rotor. This type of motors include a motor in which a Hall effect sensor for detecting a rotation angle of a rotor is attached to a stator. The Hall effect sensor detects magnetic flux caused by a permanent magnet. A timing at which an inter-pole part of the permanent magnet passes through a position of the Hall effect sensor is detected based on a change in the magnetic flux detected by the Hall effect sensor.

The Hall effect sensor has to be arranged as close as possible to a surface of the permanent magnet in order to facilitate detection of the magnetic flux. Thus, in a stator disclosed in Patent Reference 1, a stator core is formed of two C-shaped stator elements facing each other across a rotor, and the two stator elements are fixed to each other by bridges made of plastic. The Hall effect sensor is mounted in a concave part provided on the bridge.

PATENT LITERATURE

Patent Reference 1: Japanese Patent Application Publication No. 2013-201893 (see FIG. 1)

However, in the stator described above, the number of components increases since the bridges for fixing the two stator elements to each other are provided.

Further, a general type of stator core, made by arranging a plurality of stator elements in a ring shape, is not provided with the bridges. Therefore, proving the bridges just for the purpose of fixing the Hall effect sensor leads to an increase in manufacturing cost.

SUMMARY

An object of the present invention is made to solve the above-described problems, and an object of the present invention is to simplify a configuration for attaching the Hall effect sensor to the stator and to inhibit the increase in manufacturing cost.

A stator according to the present invention includes a first split core having a first yoke part extending in a circumferential direction about an axis line and a first tooth extending from the first yoke part toward the axis line, the first tooth having a tip end part on a side opposite to the first yoke part, a second split core having a second yoke part extending in the circumferential direction and a second tooth extending from the second yoke part toward the axis line, the second tooth having a tip end part on a side opposite to the second yoke part, a first insulator arranged to surround the first tooth and having a first holding part located between the tip end part of the first tooth and the tip end part of the second tooth, a second insulator arranged to surround the second tooth and having a second holding part located between the tip end part of the first tooth and the tip end part of the second tooth, and a Hall effect sensor held by the first holding part and the second holding part.

A method for attaching a Hall effect sensor according to the present invention includes the steps of preparing a first split core having a first yoke part and a first tooth having a tip end part on a side opposite to the first yoke part and a second split core having a second yoke part and a second tooth having a tip end part on a side opposite to the second yoke part, attaching a first insulator to surround the first tooth and attaching a second insulator to surround the second tooth, connecting the first split core and the second split core together in a circumferential direction about an axis line, and attaching a Hall effect sensor between a first holding part arranged in the first insulator between the tip end part of the first tooth and the tip end part of the second tooth and a second holding part arranged in the second insulator between the tip end part of the first tooth and the tip end part of the second tooth. The first holding part has a first surface facing one of surfaces of the Hall effect sensor in the circumferential direction and the second holding part has a second surface facing the other of the surfaces of the Hall effect sensor in the circumferential direction. A distance between the first surface and the second surface is greater than a length of the Hall effect sensor in the circumferential direction. At least one of the first surface and the second surface is inclined with respect to a direction of the axis line. The step of attaching the Hall effect sensor includes the steps of inserting the Hall effect sensor into between the first holding part and the second holding part in the direction of the axis line while monitoring output of the Hall effect sensor, and fixing the Hall effect sensor to the first holding part and the second holding part when the output of the Hall effect sensor reaches a reference value.

According to the present invention, a configuration for attaching the Hall effect sensor to the stator can be simplified and the increase in manufacturing cost can be inhibited.

DETAILED DESCRIPTION

First Embodiment (Configuration of Motor)

Figure 1:
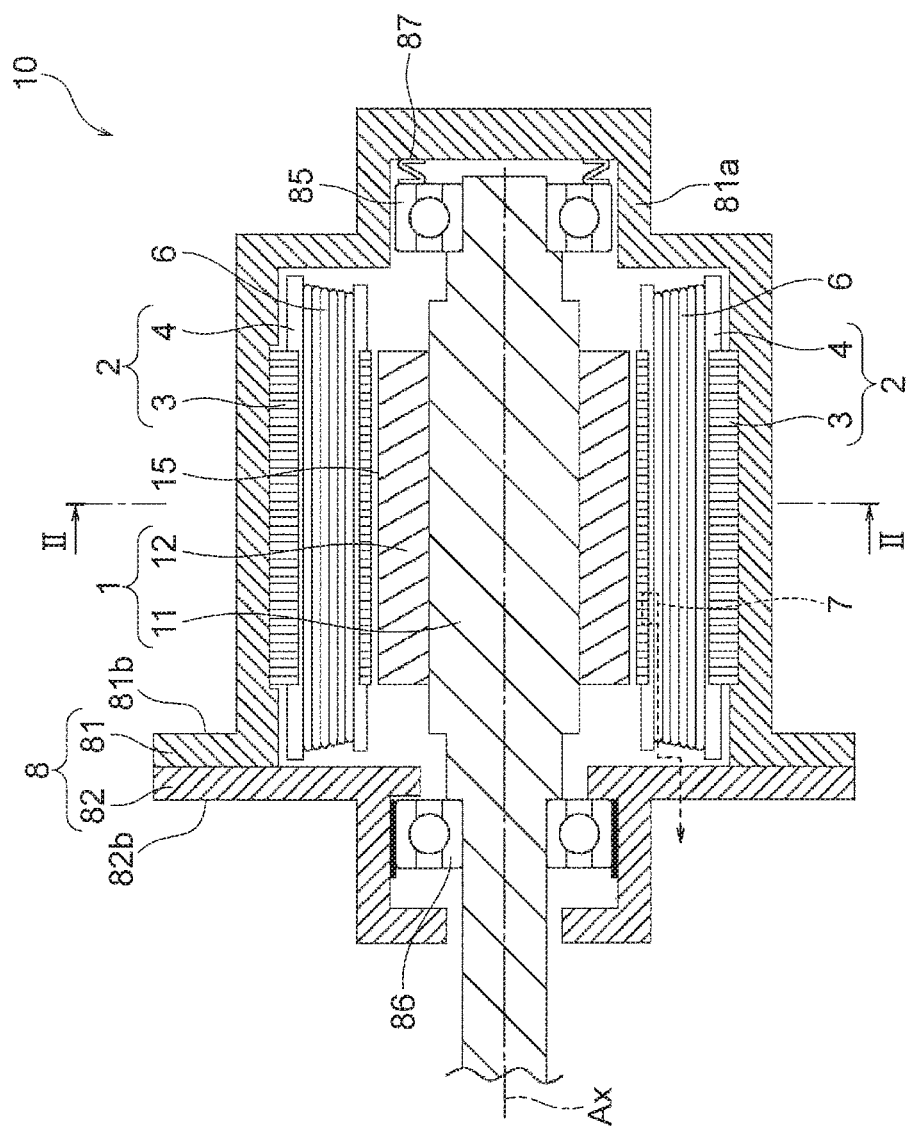
FIG. 1 is a longitudinal sectional view showing a configuration of a motor in a first embodiment.
Figure 2:
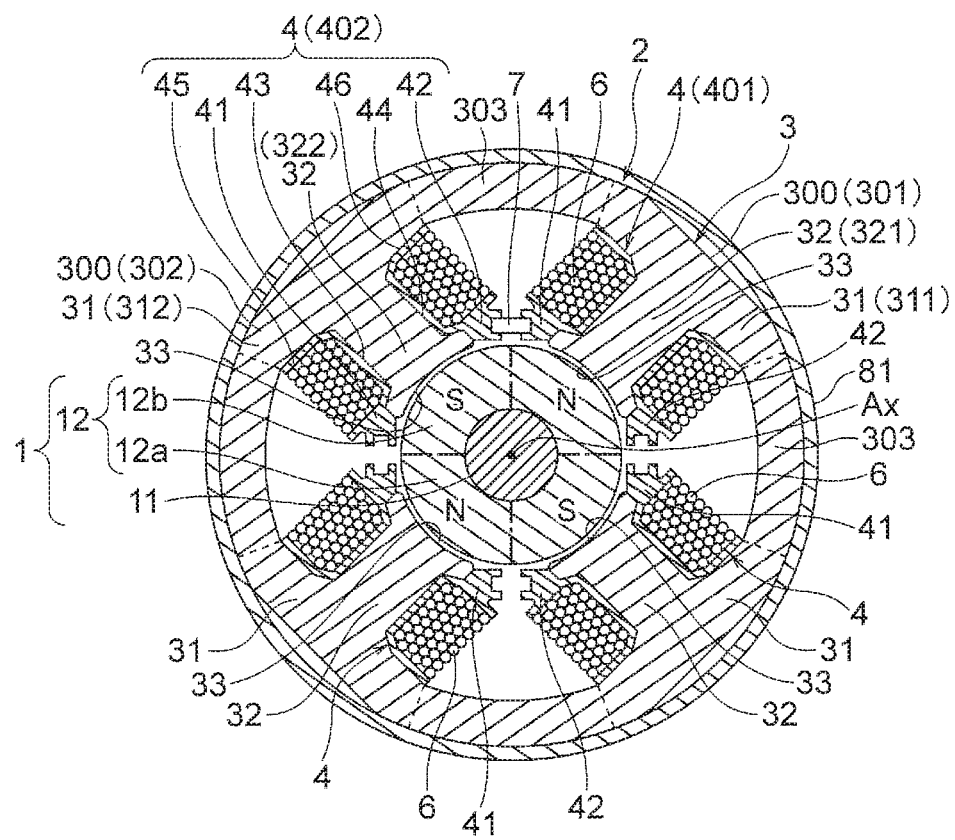
FIG. 2 is a cross-sectional view showing the configuration of the motor in the first embodiment.

First, a motor according to a first embodiment of the present invention will be described. FIG. 1 is a longitudinal sectional view showing a configuration of a motor 10 in the first embodiment. FIG. 2 is a cross-sectional view showing the configuration of the motor 10 in the first embodiment. FIG. 2 corresponds to a cross-sectional view taken along a line II-II in FIG. 1 in a direction of arrows. The motor 10 in the first embodiment is a brushless DC motor, for example.

The motor 10 includes a rotor 1, a ring-shaped stator 2 arranged around the rotor 1, a frame (housing) 8 that houses the stator 2, bearings 85 and 86, and a spring 87.

The frame 8 is divided in a direction of a rotation axis (axis line Ax) of the rotor 1 into a first frame part 81 and a second frame part 82. The first frame part 81 has a cylindrical shape, and the stator 2 is inserted in the first frame part 81. The first frame part 81 has a bearing holding part 81a at an end in the axial direction. The bearing 85 is mounted inside the bearing holding part 81a. Further, the first frame part 81 has a flange part 81b at an end on the second frame part 82 side.

The bearing 86 is mounted inside the second frame part 82, and the second frame part 82 has a flange part 82b provided at an end on the first frame part 81 side. The flange parts 81b and 82b of the first and second frame parts 81 and 82 are fixed to each other by adhesion, fastening with screws, or welding.

The bearings 85 and 86 rotatably support a shaft 11 of the rotor 1. The shaft 11 penetrates the second frame part 82 in the axial direction and protrudes to outside. A tip end part of the shaft 11 is provided with an impeller 91 (FIG. 19), for example.

The spring 87 for applying pressure in the axial direction to the bearing 85 is arranged between the bearing 85 and the bearing holding part 81a of the first frame part 81. The spring 87 is formed of a wave washer or the like, for example.

Hereinafter, a direction of the axis line Ax as the rotation axis of the rotor 1 will be referred to as an "axial direction". Further, a rotational circumferential direction about the shaft 11 (i.e., a direction along an outer circumference of the rotor 1 or the stator 2) will be referred to as a "circumferential direction". Further, a rotational radial direction about the shaft 11 (i.e., a radial direction of the rotor 1 and the stator 2) will be referred to as a "radial direction".

As shown in FIG. 2, the rotor 1 includes the shaft 11 and a permanent magnet 12 provided on an outer circumferential side of the shaft 11. The permanent magnet 12 includes two arc-shaped magnet parts 12a and two arc-shaped magnet parts 12b, and has a ring-like shape as a whole. Thus, the number of permanent magnets 12 (i.e., the number of poles) is four. The permanent magnet 12 (magnet parts 12a and 12b) is fixed to an outer circumferential surface of the shaft 11 by means of adhesion or the like.

The magnet part 12a is magnetized so that its outer circumferential surface serves as a north pole. The magnet part 12b is magnetized so that its outer circumferential surface serves as a south pole. A boundary between adjacent magnet parts 12a and 12b of the permanent magnet 12 is an inter-pole part (indicated by a reference character M in FIG. 3).

Incidentally, a configuration of the rotor 1 is not limited to the example described above. For example, the number of poles of the permanent magnet 12 is not limited to four, and it is sufficient that the number of poles is two or more. Further, the rotor 1 may have a configuration in which plate-like or hog-backed permanent magnets are attached to the outer circumferential surface or in magnet insertion holes of the rotor core.

The stator 2 includes a stator core 3, insulators 4 attached to the stator core 3, coils 6 (winding) wound around the stator core 3 via the insulators 4, and a Hall effect sensor 7 held by the insulators 4.

The stator core 3 includes a yoke part 31 having a ring-shape about the axis line Ax as the rotation axis of the rotor 1 (center axis of the shaft 11) and a plurality of (four in this example) teeth 32 extending inward in the radial direction from the yoke part 31. A slot is formed between adjacent teeth 32. Each tooth 32 has a tooth tip end part 33 at an inner end in the radial direction, and the tooth tip end part 33 faces the outer circumferential surface of the rotor 1. The tooth tip end part 33 is formed to be greater in width (length in the circumferential direction) than other parts of the tooth 32.

Figure 5:
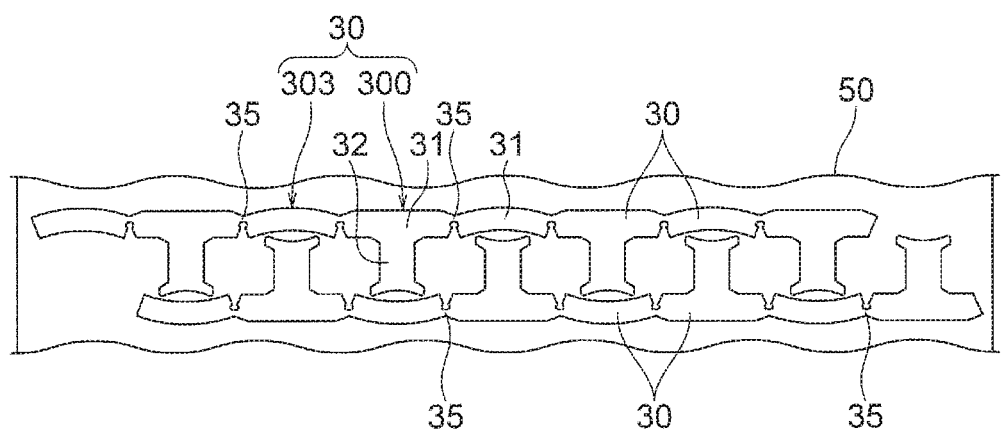
FIGS. 5(A) and 5(B) are a plan view and a cross-sectional view for explaining a manufacturing method of the motor in the first embodiment, each corresponding to a step.
Figure 5:
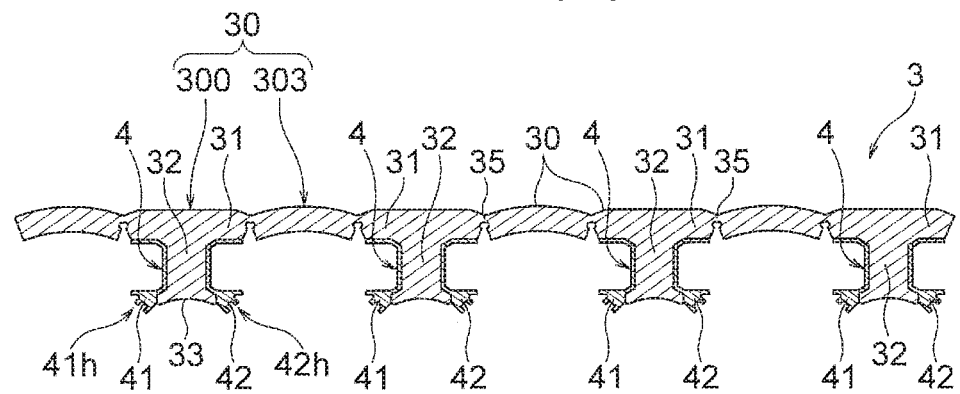

The stator core 3 is formed by combining a plurality of (eight in this example) split cores 30 (FIG. 5(B)) into a ring shape. In this example, four split cores 30 each including the yoke part 31 and the tooth 32 (referred to as split cores 300) and four split cores 30 each including the yoke part 31 and no tooth 32 (referred to as split cores 303) are alternately arranged in the circumferential direction. The four split cores 300 have the same configuration as each other. Further, the four split cores 303 have the same configuration as each other.

For convenience of the explanation, among the four split cores 300 having the teeth 32, the split core 300 on the upper right in FIG. 2 will be referred to as a first split core 301, and a split core 300 (the split core 300 on the upper left in FIG. 2) adjacent to the first split core 301 via a split core 303 having no tooth 32 will be referred to as a second split core 302, for example.

In this case, the first split core 301 includes a first yoke part 311 and a first tooth 321. The second split core 302 includes a second yoke part 312 and a second tooth 322. The first tooth 321 and the second tooth 322 are adjacent to each other in the circumferential direction.

A relationship between the first split core 301 and the second split core 302 explained here is applicable to any combination of two split cores 300 whose teeth 32 are adjacent to each other in the circumferential direction among the four split cores 300.

The stator core 3 is formed by punching a plurality of electromagnetic steel sheets 50 (FIG. 5(A)) each having a thickness of 0.1 to 0.7 mm, stacking the punched electromagnetic steel sheets 50 in the axial direction, and fixing the electromagnetic steel sheets 50 together by crimping or the like. This point will be described later.

The insulator 4 is provided so as to surround both end surfaces of the tooth 32 of the stator core 3 in the circumferential direction and both end surfaces of the tooth 32 in the axial direction. In this example, the stator core 3 has four teeth 32, and thus the number of the insulators 4 is also four. However, the numbers of teeth 32 and the insulators 4 can be set properly depending on the number of poles.

The insulator 4 is formed of insulating material. More specifically, the insulator 4 is formed of resin such as PPS (polyphenylene sulfide) or PET (polyethylene terephthalate), for example. The coil 6 is wound around the insulator 4.

The insulator 4 has flange parts 41 and 42 on an inner side in the radial direction, and the flange parts 41 and 42 are located on both sides of the tooth tip end part 33 in the circumferential direction. One flange part 41 of each insulator 4 faces the other flange part 42 of an adjacent insulator 4. The Hall effect sensor 7 is held between the flange parts 41 and 42 facing each other.

Among the four insulators 4, the insulator 4 provided on the aforementioned first tooth 321 of the first split core 301 will be referred to as a first insulator 401, for example. Further, the insulator 4 provided on the second tooth 322 of the second split core 302 will be referred to as a second insulator 402. In this case, the flange part 41 of the first insulator 401 faces the flange part 42 of the second insulator 402 in the circumferential direction.

Figure 3:
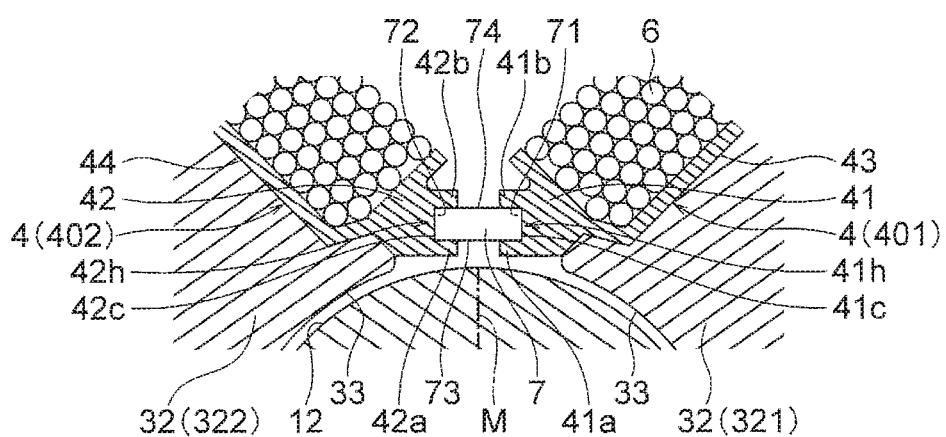
FIG. 3 is an enlarged cross-sectional view showing magnet holding parts of insulators in the first embodiment.

FIG. 3 is an enlarged cross-sectional view showing the vicinity of the flange parts 41 and 42 of the insulators 4. The Hall effect sensor 7 is arranged so as to face the outer circumferential surface of the permanent magnet 12 of the rotor 1. A cross-sectional shape of the Hall effect sensor 7 in a plane perpendicular to the axial direction is a rectangular shape. In other words, the Hall effect sensor 7 has a rectangular cross section.

The Hall effect sensor 7 has a first surface 71 as an end surface in the circumferential direction facing the flange part 41 of the insulator 4, a second surface 72 as the other end surface in the circumferential direction facing the flange part 42 of the insulator 4, a third surface 73 facing the outer circumferential surface of the permanent magnet 12, and a fourth surface 74 as a surface opposite to the third surface 73.

The flange part 41 of the insulator 4 has a contact part 41a contacting the third surface 73 of the Hall effect sensor 7 and a contact part 41b contacting the fourth surface 74 of the Hall effect sensor 7. The contact parts 41a and 41b face each other in the radial direction. Further, the flange part 41 of the insulator 4 has a positioning surface (first surface) 41c contacting the first surface 71 of the Hall effect sensor 7. The contact parts 41a and 41b and the positioning surface 41c constitute a sensor holding part 41h in the form of a groove.

The flange part 42 of the insulator 4 has a contact part 42a contacting the third surface 73 of the Hall effect sensor 7 and a contact part 42b contacting the fourth surface 74 of the Hall effect sensor 7. The contact parts 42a and 42b face each other in the radial direction. Further, the flange part 42 of the insulator 4 has a positioning surface (second surface) 42c contacting the second surface 72 of the Hall effect sensor 7. The contact parts 42a and 42b and the positioning surface 42c constitute a sensor holding part 42h in the form of a groove.

The Hall effect sensor 7 is held by the sensor holding parts 41h and 42h of the flange parts 41 and 42 from both sides in the circumferential direction. With this configuration, the Hall effect sensor 7 is held at a position facing the outer circumferential surface of the permanent magnet 12 of the rotor 1.

Figure 4:
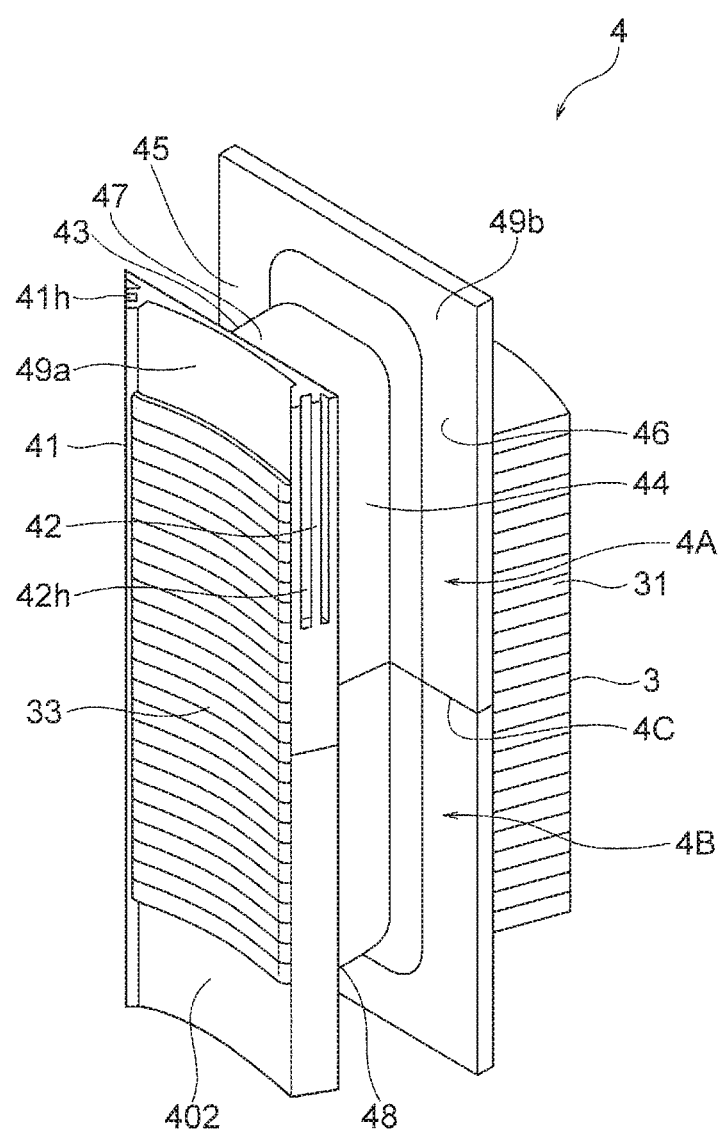
FIG. 4 is a perspective view showing an external shape of the insulator in the first embodiment.

FIG. 4 is a schematic diagram showing an example of an external shape of the insulator 4. The insulator 4 has a pair of wall parts 43 and 44 covering both end surfaces of the tooth 32 in the circumferential direction, a pair of wall parts 47 and 48 covering both end surfaces of the tooth 32 in the axial direction, and the flange parts 41 and 42 located at both ends of the tooth tip end part 33 in the circumferential direction.

An opening part is formed between the flange parts 41 and 42 of the insulator 4, and the tooth tip end part 33 faces the permanent magnet 12 (FIG. 2) of the rotor 1 via the opening part. The aforementioned sensor holding parts 41h and 42h are formed in the flange parts 41 and 42 of the insulator 4.

Each of the sensor holding parts 41h and 42h is formed as a groove extending from one end surface of the insulator 4 in the axial direction (upper end surface in the figure) to an attachment position of the Hall effect sensor 7. Wirings of the Hall effect sensor 7 are taken out from the aforementioned end surface of the insulator 4 in the axial direction via the sensor holding parts 41h and 42h.

The insulator 4 further has wall parts 45 and 46 respectively facing outer sides of the flange parts 41 and 42 in the radial direction. The flange parts 41 and 42 and the wall parts 45 and 46 are arranged on both sides in the radial direction of a region in which the coil 6 (FIG. 2) is wound around the insulator 4.

The insulator 4 further has a wall part 49a extending in the axial direction from the flange parts 41 and 42 toward outside of the stator core 3 and a wall part 49b extending in the axial direction from the wall parts 45 and 46 toward outside of the stator core 3.

Further, the insulator 4 has a configuration split into two in the axial direction in order to facilitate attaching the insulator 4 to the teeth 32 of the stator core 3. In this example, the insulator 4 is split into a first part 4A and a second part 4B at a parting line 4C at a center in the axial direction. Incidentally, it is also possible to mold the insulator 4 integrally with the stator core 3 by setting the stator core 3 in a mold and filling the mold with resin. In this case, the insulator 4 does not have the parting line 4C.

(Manufacturing Method of Motor)

Next, a manufacturing method of the motor 10 will be described. FIG. 5(A) is a plan view for explaining the manufacturing method of the motor 10. FIG. 5(B), FIGS. 6(A), 6(B) and 6(C), and FIGS. 7(A) and 7(B) are cross-sectional views for explaining the manufacturing method of the motor 10, each corresponding to a step.

First, as shown in FIG. 5(A), an electromagnetic steel sheet 50 is punched into a shape in which a plurality of (eight in this example) split cores 30 are linearly connected. A thin-wall part 35 is formed between the yoke parts 31 of adjacent split cores 30. The thin-wall part 35 deforms plastically when the split cores 30 are connected together into a ring shape (FIG. 6(B) which will be explained later).

In the split cores 30, the split cores 300 each including the yoke part 31 and the tooth 32 and the split cores 303 each including the yoke part 31 only are arranged alternately as described above. In FIG. 5(A), in order to economically use the electromagnetic steel sheet 50, the punching is carried out so that the split core 300 and the split core 303 among the split cores 30 in a line respectively face the split core 303 and the split core 300 in another line. However, the punching pattern of the electromagnetic steel sheet 50 is not limited to this example.

A plurality of punched electromagnetic steel sheets 50 are stacked in the axial direction, by which the stator core 3 is constituted as shown in FIG. 5(B). However, at the step shown in FIG. 5(B), the split cores 30 constituting the stator core 3 are not connected together into the ring shape and are still spread linearly.

Subsequently, the insulator 4 is attached to each tooth 32 of the stator core 3. Since the insulator 4 has a configuration split into the first part 4A and the second part 4B as described above with reference to FIG. 4, the insulator 4 can be attached to the tooth 32 from both sides in the axial direction.

Figure 6:
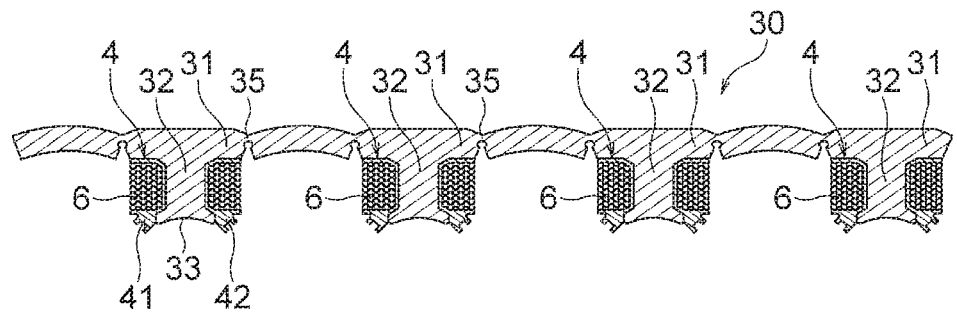
FIGS. 6(A), 6(B) and 6(C) are cross-sectional views for explaining the manufacturing method of the motor in the first embodiment, each corresponding to a step.
Figure 6:
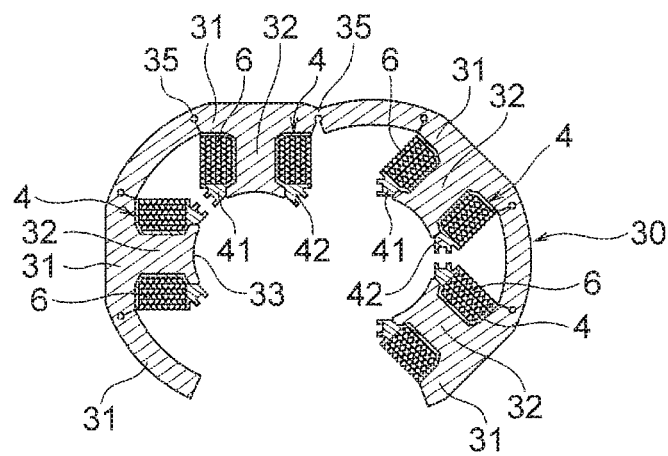
Figure 6:
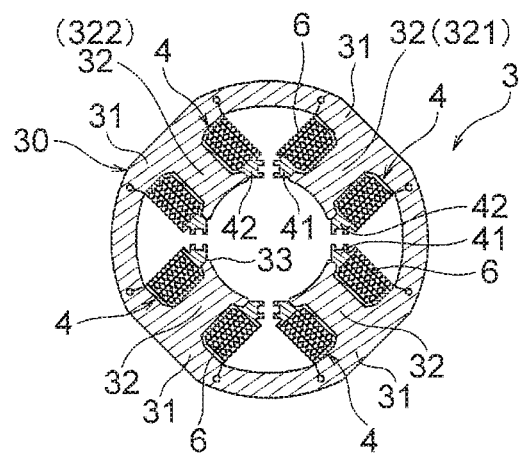

Subsequently, as shown in FIG. 6(A), the coil 6 is wound around the insulator 4 attached to each tooth 32. At this stage, the split cores 30 are spread linearly and there is a sufficient space on each side of the insulator 4, and thus winding operation of the coil 6 can be easily carried out.

After the winding of the coils 6 is completed, the split cores 30 are bent into the ring shape as shown in FIG. 6(B). Accordingly, each thin-wall part 35 between adjacent split cores 30 deforms plastically. Further, the yoke parts 31 of two split cores 30 at both ends are welded to each other.

Thus, the stator core 3 including the split cores 30 connected together in the ring shape is obtained as shown in FIG. 6(C). In this state, the flange part 41 of the insulator 4 attached to the certain tooth 32 (i.e., the first tooth 321) of the stator core 3 faces the flange part 42 of the insulator 4 attached to the adjacent tooth 32 (i.e., the second tooth 322) in the circumferential direction. In other words, the flange parts 41 and 42 of the insulators 4 attached to two adjacent teeth 32 face each other.

Figure 7:
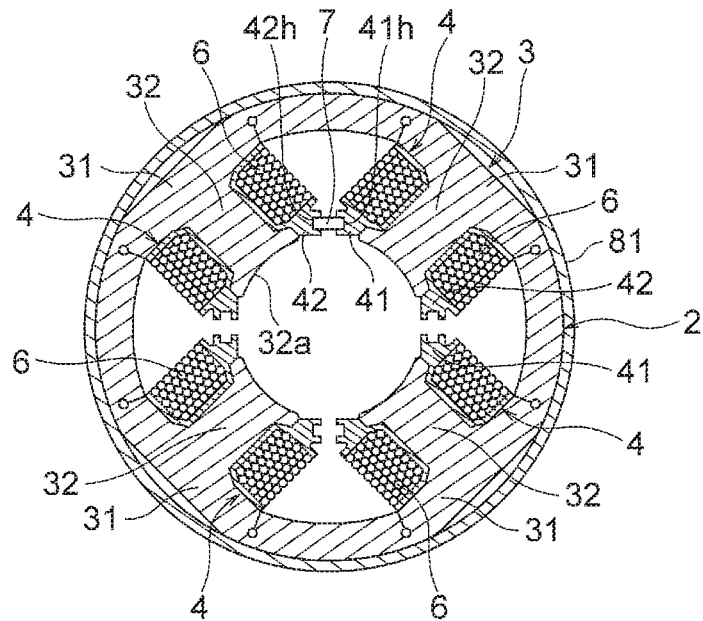
FIGS. 7(A) and 7(B) are cross-sectional views for explaining the manufacturing method of the motor in the first embodiment, each corresponding to a step.
Figure 7:
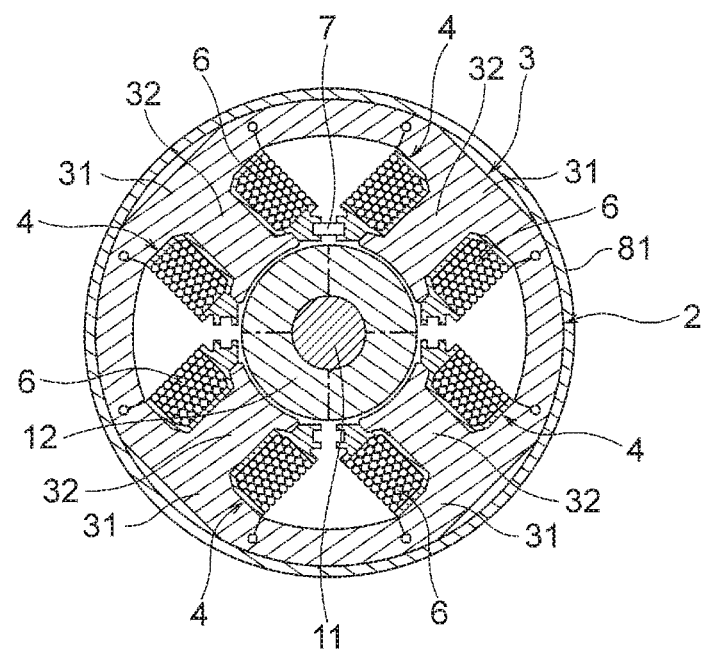

Subsequently, as shown in FIG. 7(A), the stator core 3 is pressed into the first frame part 81 of the frame 8. Then, the Hall effect sensor 7 is inserted in the axial direction into the sensor holding parts 41h and 42h (concave parts) of the flange parts 41 and 42 of the insulators 4 and fixed to the sensor holding parts 41h and 42h. The Hall effect sensor 7 is fixed to the sensor holding parts 41h and 42h by means of fitting. Thus, the stator 2 including the stator core 3, the insulators 4 and the Hall effect sensor 7 is obtained.

On the other hand, in regard to the rotor 1, the permanent magnet 12 is attached to the shaft 11 and thereafter the bearings 85 and 86 are fitted to the shaft 11. Then, as shown in FIG. 7(B), the rotor 1 is inserted into inside of the stator core 3 of the stator 2. Thereafter, the frame 8 (FIG. 1) is formed by fixing the second frame part 82 to the first frame part 81. Thus, the motor 10 is completed.

Incidentally, while the split cores 30 formed continuously via the thin-wall parts 35 as shown in FIG. 5(B) are used in this example, it is also possible to form the split cores 30 independently of each other, combine the split cores 30 into a ring shape, and weld the split cores 30 to each other.

(Effect of Embodiment)

As described above, in the first embodiment of the present invention, the flange parts 41 and 42 at the tip end parts (inner ends in the radial direction) of the adjacent insulators 4 are provided with the sensor holding parts 41h and 42h, and the Hall effect sensor 7 is held between the sensor holding parts 41h and 42h. With such a configuration, it becomes unnecessary to specifically provide members exclusively for holding the Hall effect sensor 7. Consequently, the configuration for attaching the Hall effect sensor 7 can be simplified and the manufacturing cost can be reduced.

Further, since the Hall effect sensor 7 is held by the flange parts 41 and 42 of the insulators 4, the Hall effect sensor 7 can be made to face the permanent magnet 12 of the rotor 1 at a position close to the permanent magnet 12. Accordingly, the accuracy of detection of the inter-pole part by the Hall effect sensor 7 can be enhanced and the driving accuracy of the motor 10 can be increased.

Furthermore, since the stator core 3 is made of the split cores 30 connected together into a ring shape, the insulators 4 can be attached to the teeth 32 with ease and the coils 6 can be wound around the insulators 4 with ease.

Further, since the sensor holding parts 41h and 42h have the positioning surfaces 41c and 42c contacting the first surface 71 and the second surface 72 on both sides of the Hall effect sensor 7 in the circumferential direction, the Hall effect sensor 7 can be precisely positioned in the circumferential direction.

In addition, since the sensor holding parts 41h and 42h have the contact parts 41a, 41b, 42a and 42b contacting the third surface 73 on the inner side of the Hall effect sensor 7 in the radial direction and the fourth surface 74 on the outer side of the Hall effect sensor 7 in the radial direction, the Hall effect sensor 7 can be precisely positioned in the radial direction.

Incidentally, the configuration and the number of the split cores 30 constituting the stator core 3 are not limited to the above-described example. Further, while the split cores 300 each including the yoke part 31 and the tooth 32 and the split cores 303 each including the yoke part 31 only (including no tooth 32) are used as the split cores 30 in the above-described example, it is also possible that every split core 30 of the stator core 3 includes the yoke part 31 and the tooth 32.

First Modification

Figure 8:
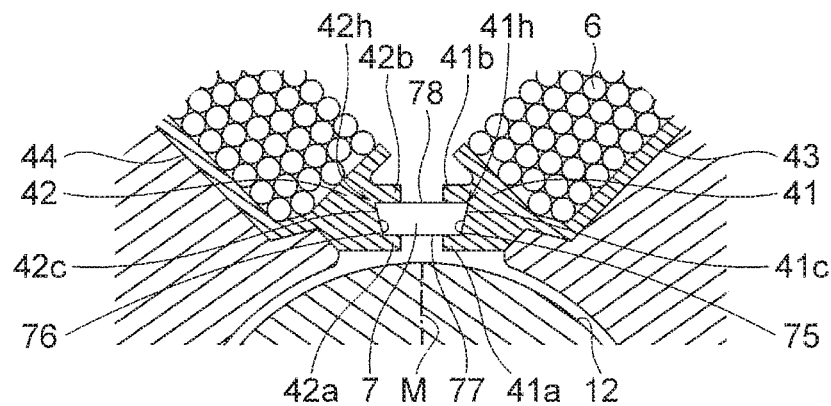
FIG. 8 is an enlarged cross-sectional view showing magnet holding parts of insulators in a first modification of the first embodiment.

FIG. 8 is a cross-sectional view showing flange parts 41 and 42 of insulators 4 in a first modification of the first embodiment. In the first embodiment described above, the cross-sectional shape of the Hall effect sensor 7 in a plane perpendicular to the axial direction is a rectangular shape. In contrast, in this first modification, the cross-sectional shape of the Hall effect sensor 7 in a plane perpendicular to the axial direction is a trapezoidal shape.

In the first modification shown in FIG. 8, the sensor holding parts 41h and 42h of the flange parts 41 and 42 of the insulators 4 have shapes along an outer shape of the Hall effect sensor 7 having the trapezoidal cross-sectional shape. In this example, a first surface 75 and a second surface 76 of the Hall effect sensor 7 on both sides in the circumferential direction are formed as inclined surfaces, and a third surface 77 on the inner side in the radial direction is smaller than a fourth surface 78 on the outer side in the radial direction.

In this example, the positioning surface 41c of the sensor holding part 41h is formed as an inclined surface corresponding to the first surface 75 of the Hall effect sensor 7. Further, the positioning surface 42c of the sensor holding part 42h is formed as an inclined surface corresponding to the second surface 76 of the Hall effect sensor 7.

Configurations of the contact parts 41a and 42a and the contact parts 41b and 42b arranged on both sides of the Hall effect sensor 7 in the radial direction are as described in the first embodiment. The Hall effect sensor 7 is fixed to the sensor holding parts 41h and 42h by means of fitting.

Also in this first modification, the configuration for attaching the Hall effect sensor 7 having the trapezoidal cross section can be simplified and the manufacturing cost can be reduced.

Second Modification

Figure 9:
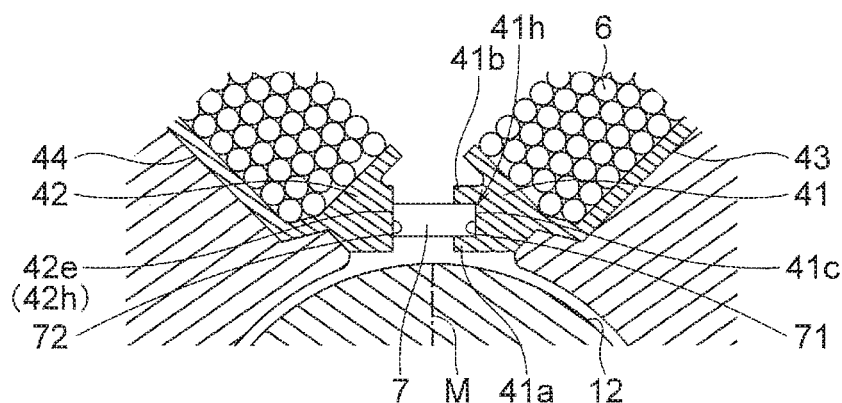
FIG. 9 is an enlarged cross-sectional view showing magnet holding parts of insulators in a second modification of the first embodiment.

FIG. 9 is a cross-sectional view showing flange parts 41 and 42 of insulators 4 in a second modification of the first embodiment. In the first embodiment described above, the sensor holding parts 41h and 42h (FIG. 3) of the flange parts 41 and 42 of the insulators 4 are both formed as grooves. In contrast, in this second modification, only one of the sensor holding parts 41h and 42h of the flange parts 41 and 42 of the insulators 4 is formed as a groove and the other is formed as a contact surface.

In the second modification shown in FIG. 9, the sensor holding part 42h of the flange part 42 is formed as a flat surface 42e. The sensor holding part 41h of the flange part 41 is formed as a groove similarly to the first embodiment.

The second surface 72 side of the Hall effect sensor 7 is fixed to the sensor holding part 42h (the flat surface 42e) with an adhesive agent. The first surface 71 side of the Hall effect sensor 7 is fixed to the sensor holding part 41h by means of fitting.

Incidentally, while the sensor holding part 42h of the flange part 42 is formed as a flat surface and the sensor holding part 41h of the flange part 41 is formed as a groove in this example, it is also possible to form the sensor holding part 42h of the flange part 42 as a groove and the sensor holding part 41h of the flange part 41 as a flat surface.

In this second modification, in addition to the effects described in the first embodiment, the configuration of one of the flange parts 41 and 42 of the insulators 4 can be simplified.

Third Modification

Figure 10:
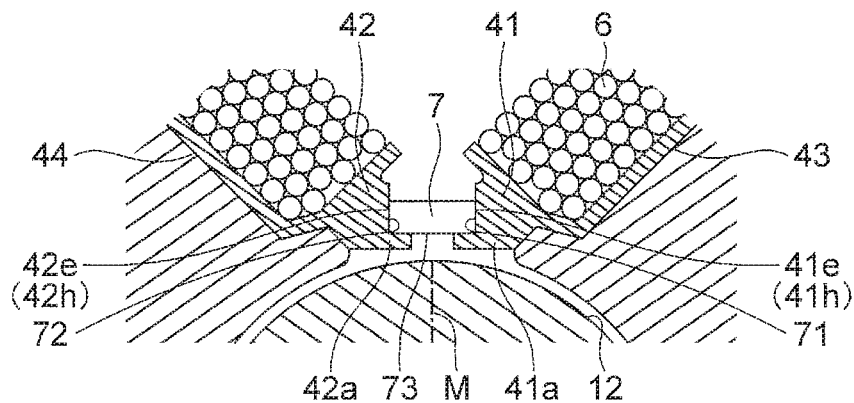
FIG. 10 is an enlarged cross-sectional view showing magnet holding parts of insulators in a third modification of the first embodiment.

FIG. 10 is a cross-sectional view showing flange parts 41 and 42 of insulators 4 in a third modification of the first embodiment. In the first embodiment described above, the sensor holding parts 41h and 42h (FIG. 3) of the flange parts 41 and 42 of the insulators 4 have the contact parts 41a, 41b, 42a and 42b contacting the surfaces (the third surface 73 and the fourth surface 74) on both sides of the Hall effect sensor 7 in the radial direction.

In contrast, in this third modification, the sensor holding parts 41h and 42h of the flange parts 41 and 42 of the insulators 4 have the contact parts 41a and 42a contacting the third surface 73 of the Hall effect sensor 7 on the inner side in the radial direction (the axis line Ax side in FIG. 2) but have no contact part contacting the fourth surface 74 on the outer side in the radial direction.

In this third modification, the Hall effect sensor 7 is fixed to the sensor holding parts 41h and 42h with an adhesive agent in a state where the third surface 73 is brought into contact with the contact parts 41a and 42a.

In this third modification, in addition to the effects described in the first embodiment, the configurations of the flange parts 41 and 42 of the insulators 4 can be simplified.

Second Embodiment

Figure 11:
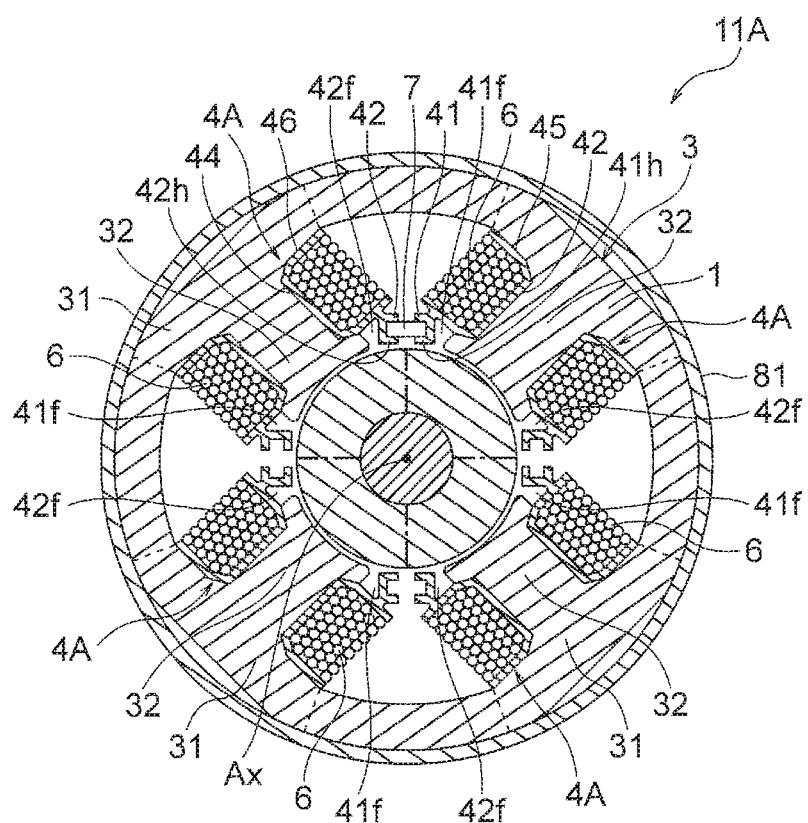
FIG. 11 is a cross-sectional view showing a configuration of a motor in a second embodiment.

Next, a second embodiment of the present invention will be described. FIG. 11 is a cross-sectional view showing a motor 10A in the second embodiment. In the second embodiment, in the flange parts 41 and 42 of the insulators 4, notches 41f and 42f are formed on both sides of the sensor holding parts 41h and 42h in the circumferential direction.

Figure 12:
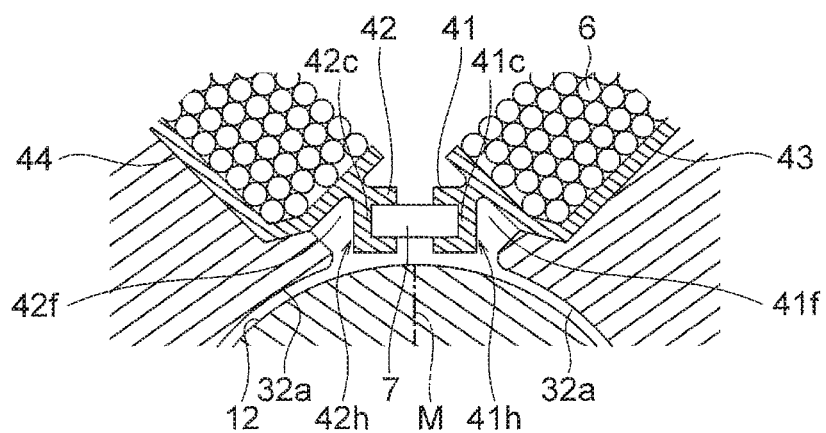
FIG. 12 is an enlarged cross-sectional view showing magnet holding parts of insulators in the second embodiment.

FIG. 12 is an enlarged cross-sectional view showing the flange parts 41 and 42 of the insulators 4 of the motor 10A. In the flange part 41 of the insulator 4, the notch 41f is formed on a side of the sensor holding part 41h (first holding part) opposite to the Hall effect sensor 7. In the flange part 42 of the insulator 4, the notch 42f is formed on a side of the sensor holding part 42h (second holding part) opposite to the Hall effect sensor 7.

In other words, the flange parts 41 and 42 of the insulators 4 are configured so that the sensor holding parts 41h and 42h can resiliently deform toward both sides in the circumferential direction. When the Hall effect sensor 7 is pressed into the sensor holding parts 41h and 42h, the sensor holding parts 41h and 42h once deform resiliently to widen outward in the circumferential direction and thereafter hold the Hall effect sensor 7 from both sides in the circumferential direction by resilient restoring force. Namely, the sensor holding parts 41h and 42h resiliently hold the Hall effect sensor 7.

There is a possibility that variations occur in a distance between the sensor holding parts 41h and 42h (specifically, a distance between the positioning surfaces 41c and 42c) due to variations in dimensions of the insulators 4 and fitting tolerances when the insulators 4 are attached to the stator core 3. Further, when the plurality of split cores 30 are connected together into a ring shape to form the stator core 3, relative displacement of the sensor holding parts 41h and 42h can cause variations in the distance between the sensor holding parts 41h and 42h.

In a case where the distance between the sensor holding parts 41h and 42h is smaller than a design value due to the variations, the attachment of the Hall effect sensor 7 is difficult, and forcedly attaching the Hall effect sensor 7 may cause breakage of the insulator 4 or the Hall effect sensor 7. In contrast, if the distance between the sensor holding parts 41h and 42h is set wide in consideration of the variations, the attachment of the Hall effect sensor 7 is facilitated, but displacement of the Hall effect sensor 7 in the circumferential direction may occur and the magnetic flux detection accuracy of the Hall effect sensor 7 may deteriorate.

In this second embodiment, the sensor holding parts 41h and 42h are resiliently deformable in the circumferential direction to absorb the variations in the distance between the sensor holding parts 41h and 42h. Thus, the attachment of the Hall effect sensor 7 is facilitated, and the deterioration in the detection accuracy and the breakage of components can be inhibited. Incidentally, the Hall effect sensor 7 is fixed to the sensor holding parts 41h and 42h by means of fitting. In other respects, the configuration of the motor 10A of the second embodiment is the same as that of the motor 10 of the first embodiment.

As described above, in the second embodiment of the present invention, the flange parts 41 and 42 of the insulators 4 are configured so that the sensor holding parts 41h and 42h are resiliently deformable toward both sides in the circumferential direction. Accordingly, even when there are variations in the distance between the sensor holding parts 41h and 42h, the Hall effect sensor 7 can be easily attached, and the deterioration in the detection accuracy and the breakage of components can be inhibited.

Further, by providing the notches 41f and 42f on both sides of the sensor holding parts 41h and 42h of the flange parts 41 and 42 in the circumferential direction, the holding of the Hall effect sensor 7 by the resiliently deformable sensor holding parts 41h and 42h can be implemented with a simple configuration.

While the notches 41f and 42f in this example are formed on both sides of the sensor holding parts 41h and 42h of the flange parts 41 and 42 in the circumferential direction, it is also possible to form a notch in only one of the flange parts 41 and 42.

Third Embodiment

Figure 13:
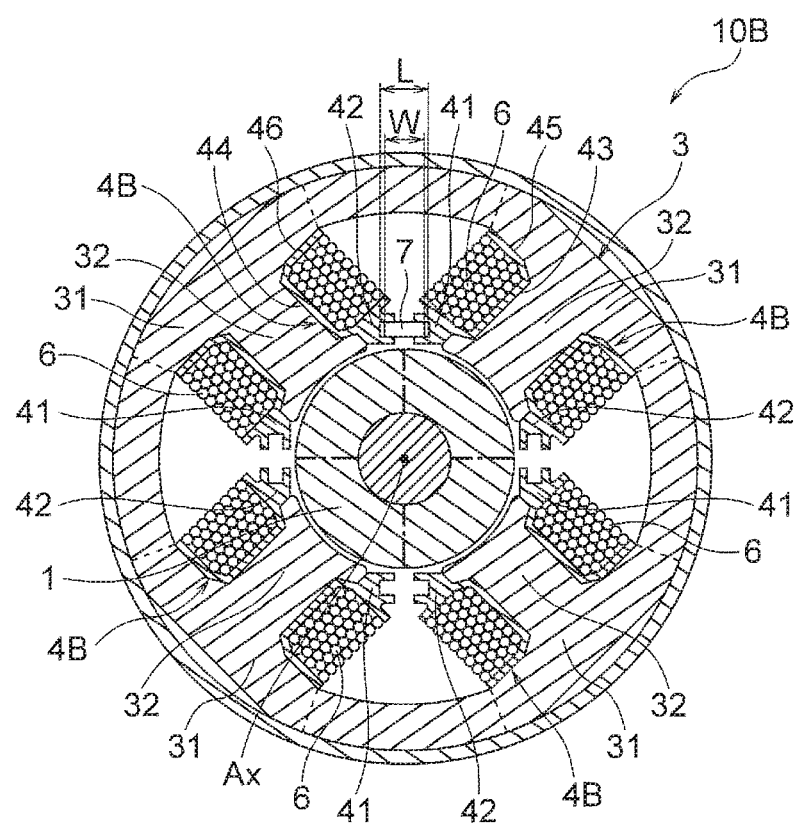
FIG. 13 is a cross-sectional view showing a configuration of a motor in a third embodiment.

Next, a third embodiment of the present invention will be described. FIG. 13 is a cross-sectional view showing a motor 10B in the third embodiment. In the third embodiment, in the flange parts 41 and 42 of the insulators 4, a distance L between the sensor holding parts 41h and 42h is greater than the width (length in the circumferential direction) W of the Hall effect sensor 7.

Figure 14:
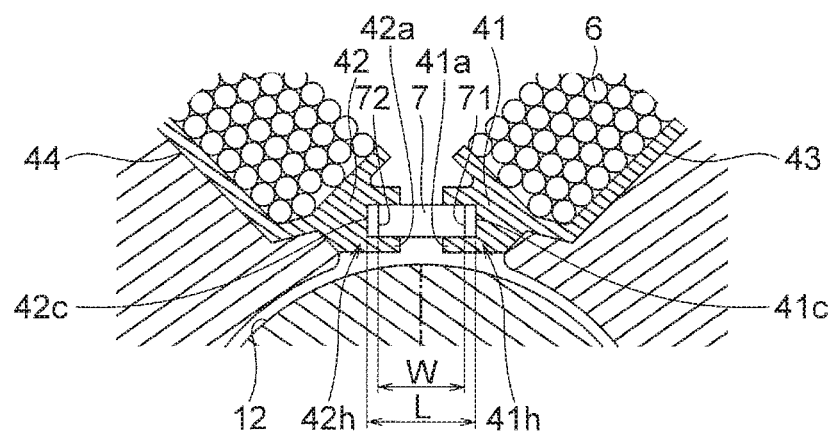
FIG. 14 is an enlarged cross-sectional view showing magnet holding parts of insulators in the third embodiment.

FIG. 14 is an enlarged cross-sectional view showing the flange parts 41 and 42 of the insulators 4 of the motor 10B. Here, the distance L between the sensor holding parts 41h and 42h is a distance between the positioning surface 41c of the sensor holding part 41h (first surface) and the positioning surface 42c of the sensor holding part 42h (second surface).

In this third embodiment, the distance (interval) L between the sensor holding parts 41h and 42h is greater than the width (length in the circumferential direction) W of the Hall effect sensor 7, and thus gaps occur between the first surface 71 of the Hall effect sensor 7 and the positioning surface 41c and between the second surface 72 of the Hall effect sensor 7 and the positioning surface 42c. These gaps are filled with an adhesive agent.

With this configuration, it is possible to set the distance between the sensor holding parts 41h and 42h wide in consideration of the variations and install the Hall effect sensor 7 between the sensor holding parts 41h and 42h while adjusting a position of the Hall effect sensor 7 in the circumferential direction.

Specifically, an adhesive agent of a UV (ultraviolet rays) curing type is previously applied to the sensor holding parts 41h and 42h, and the Hall effect sensor 7 is inserted into the sensor holding parts 41h and 42h. Thereafter, output of the Hall effect sensor 7 is monitored, and the Hall effect sensor 7 is moved in the circumferential direction between the sensor holding parts 41h and 42h. When the sensor output reaches a target value, the adhesive agent is irradiated with UV and cured. In other respects, the configuration of the motor 10B in the third embodiment is the same as that of the motor 10 in the first embodiment.

As described above, in the third embodiment of the present invention, the distance between the sensor holding parts 41h and 42h (more specifically, the distance between the positioning surfaces 41c and 42c) of the insulators 4 is greater than the width of the Hall effect sensor 7. Accordingly, it is possible to fix the Hall effect sensor 7 while positioning the Hall effect sensor 7 in the circumferential direction between the sensor holding parts 41h and 42h. Specifically, even when there are the variations in the distance between the sensor holding parts 41h and 42h described in the second embodiment, the Hall effect sensor 7 can be precisely positioned in the circumferential direction.

Incidentally, this third embodiment may be combined with the second embodiment. Namely, it is possible to form the notches in the flange parts 41 and 42 shown in FIG. 14 to make the sensor holding parts 41h and 42h resiliently hold the Hall effect sensor 7.

Fourth Embodiment

Figure 15:
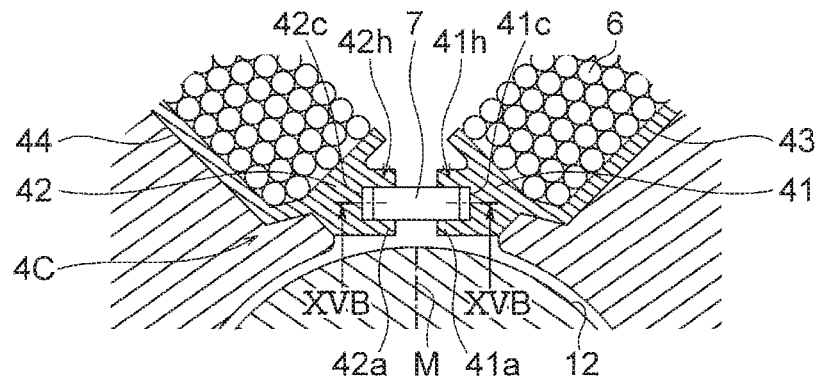
FIG. 15(A) is an enlarged cross-sectional view showing magnet holding parts of insulators in a fourth embodiment.
FIG. 15(B) is a cross-sectional view taken along a line XVB-XVB in FIG. 15(A) in a direction of arrows.
Figure 15:
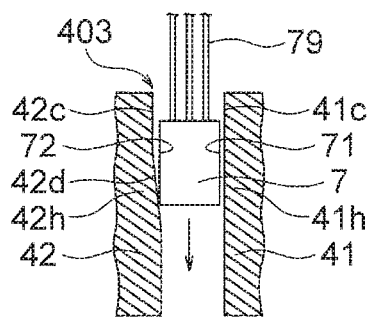

Next, a fourth embodiment of the present invention will be described. FIG. 15(A) is an enlarged cross-sectional view showing flange parts 41 and 42 of insulators 4 of a motor in the fourth embodiment. FIG. 15(B) is a cross-sectional view taken along a line XVB-XVB in FIG. 15(A) in a direction of arrows.

In this fourth embodiment, similarly to the third embodiment, the distance between the sensor holding parts 41h and 42h is greater than the width (length in the circumferential direction) of the Hall effect sensor 7. However, while the sensor holding parts 41h and 42h have the positioning surfaces 41c and 42c facing the first surface 71 and the second surface 72 at both ends of the Hall effect sensor 7 in the circumferential direction, one of the positioning surfaces 41c and 42c (the positioning surface 42c in this example) has an inclined surface 42d (FIG. 15(B)) inclined with respect to the axial direction.

In FIG. 15(B), an upper end part of the sensor holding parts 41h and 42h (referred to as a groove end part 403) is an end part on the side from which the Hall effect sensor 7 is inserted, which corresponds to an upper end surface of the insulator 4 shown in FIG. 4. The inclined surface 42d of the positioning surface 42c is inclined in a direction such that a distance to the sensor holding part 41h decreases as a distance from the groove end part 403 increases.

When the Hall effect sensor 7 is inserted into the sensor holding parts 41h and 42h, a lower end part of the Hall effect sensor 7 (end part in an inserting direction) makes contact with the inclined surface 42d. Due to the inclination of the inclined surface 42d, the position of the Hall effect sensor 7 in the circumferential direction changes depending on an amount of insertion (amount of descent) of the Hall effect sensor 7. Specifically, the position of the Hall effect sensor 7 in the circumferential direction moves toward the positioning surface 41c (rightward in the figure) as the Hall effect sensor 7 is inserted.

Since the position of the Hall effect sensor 7 in the circumferential direction changes depending on the amount of insertion of the Hall effect sensor 7 as above, the adjustment of the position of the Hall effect sensor 7 in the circumferential direction is facilitated further as compared with the third embodiment.

Since the inclination of the inclined surface 42d with respect to the axial direction is relatively small, the change in the position of the Hall effect sensor 7 in the circumferential direction is small in comparison with the amount of insertion of the Hall effect sensor 7. Accordingly, the position of the Hall effect sensor 7 in the circumferential direction can be adjusted more precisely as compared with the third embodiment. In other respects, the configuration of the motor in the fourth embodiment is the same as that of the motor 10 of the first embodiment.

Figure 16:
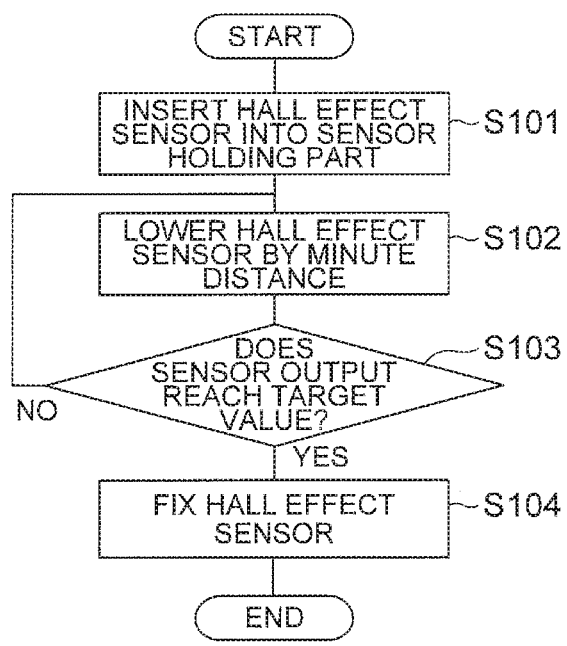
FIG. 16 is a flowchart for explaining an example of a method of attaching a Hall effect sensor in the fourth embodiment.

FIG. 16 is a flowchart for explaining a method of attaching the Hall effect sensor 7 to the sensor holding parts 41h and 42h. An adhesive agent of the UV curing type is previously applied to the sensor holding parts 41h and 42h, and the Hall effect sensor 7 is inserted into the sensor holding parts 41h and 42h from the groove end part 403 (FIG. 15(B)) (step S101). Wirings 79 (FIG. 15(B)) of the Hall effect sensor 7 are previously connected to a magnetic flux detection device.

Then, the Hall effect sensor 7 is lowered gradually while monitoring the output of the Hall effect sensor 7. Each time the Hall effect sensor 7 is lowered by a minute distance (step S102), whether the sensor output has reached a target value or not is checked (step S103).

These steps S102 and S103 are repeated and when the sensor output reaches the target value (YES in the step S103), the adhesive agent is irradiated with UV (step S104). By the UV irradiation, the adhesive agent is cured and the Hall effect sensor 7 is fixed to the sensor holding parts 41h and 42h.

As described above, in the fourth embodiment of the present invention, in the sensor holding parts 41h and 42h of the insulators 4, one of the positioning surfaces 41c and 42c facing the first surface 71 and the second surface 72 on both sides of the Hall effect sensor 7 in the circumferential direction has the inclined surface 42d inclined with respect to the axial direction. Therefore, it is possible to position the Hall effect sensor 7 in the circumferential direction while inserting the Hall effect sensor 7 into the sensor holding parts 41h and 42h. Accordingly, the positioning of the Hall effect sensor 7 can be carried out more easily and precisely.

Incidentally, while one of the positioning surfaces 41c and 42c has the inclined surface 42d in this example, it is also possible that both of the positioning surfaces 41c and 42c have inclined surfaces.

Further, this fourth embodiment may be combined with the second embodiment. Namely, it is possible to form the notches in the flange parts 41 and 42 shown in FIG. 15(A) to make the sensor holding parts 41h and 42h resiliently hold the Hall effect sensor 7.

Fifth Embodiment

Figure 17:
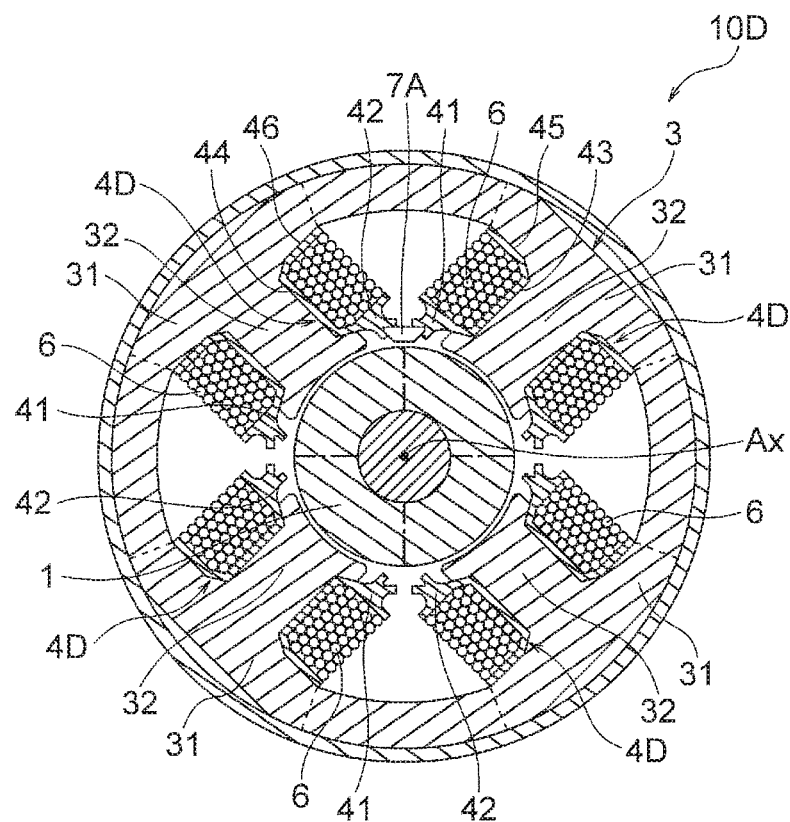
FIG. 17 is a cross-sectional view showing a configuration of a motor in a fifth embodiment.

Next, a fifth embodiment of the present invention will be described. FIG. 17 is a cross-sectional view showing a motor 10D in the fifth embodiment. In the fifth embodiment, the sensor holding parts 41k and 42k of the insulators 4 hold a Hall effect sensor 7 having a trapezoidal cross section in such a manner that the Hall effect sensor 7 projects inward in the radial direction (the axis line Ax side) with respect to the flange parts 41 and 42 of the insulators 4.

Figure 18:
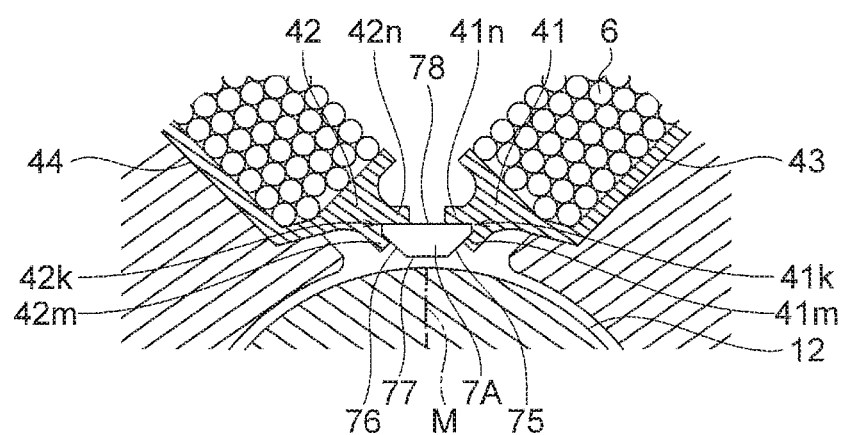
FIG. 18 is an enlarged cross-sectional view showing magnet holding parts of insulators in the fifth embodiment.

FIG. 18 is an enlarged cross-sectional view showing the flange parts 41 and 42 of the insulators 4 of the motor 10D. The first surface 75 and the second surface 76 of the Hall effect sensor 7 on both sides in the circumferential direction are inclined surfaces, and the third surface 77 on the inner side in the radial direction is smaller than the fourth surface 78 on the outer side in the radial direction.

Sensor holding parts 41k and 42k of the insulators 4 have contact parts 41m and 42m contacting the inclined first and second surfaces 75 and 76 of the Hall effect sensor 7 and contact parts 41n and 42n contacting the fourth surface 78 on the outer side of the Hall effect sensor 7 in the radial direction.

The shapes of the contact parts 41m and 42m of the sensor holding parts 41k and 42k are determined so that the third surface 77 on the inner side of the Hall effect sensor 7 in the radial direction projects inward in the radial direction with respect to the contact parts 41m and 42m. Therefore, the third surface 77 of the Hall effect sensor 7 can be made closer to the permanent magnet 12 of the rotor 1 as compared with the above-described embodiments. Accordingly, an amount of magnetic flux flowing into the third surface 77 of the Hall effect sensor 7 can be increased and the detection accuracy can be enhanced.

As described above, according to the fifth embodiment of the present invention, the sensor holding parts 41k and 42k of the insulators 4 hold the Hall effect sensor 7 having a trapezoidal cross section in such a manner that the Hall effect sensor 7 projects inward in the radial direction. Accordingly, the Hall effect sensor 7 can be placed close to the permanent magnet 12 of the rotor 1, and the detection accuracy can be enhanced.

Further, this fifth embodiment may be combined with the second embodiment. Namely, it is possible to form the notches in the flange parts 41 and 42 shown in FIG. 18 to make the sensor holding parts 41k and 42k resiliently hold the Hall effect sensor 7.

Furthermore, this fifth embodiment may be combined with the third or fourth embodiment. Namely, the distance between the sensor holding parts 41k and 42k may be set longer than the length of the Hall effect sensor 7 in the circumferential direction. Further, the surface of at least one of the contact parts 41m and 42m may be inclined with respect to the axial direction.

(Blower)

Figure 19:
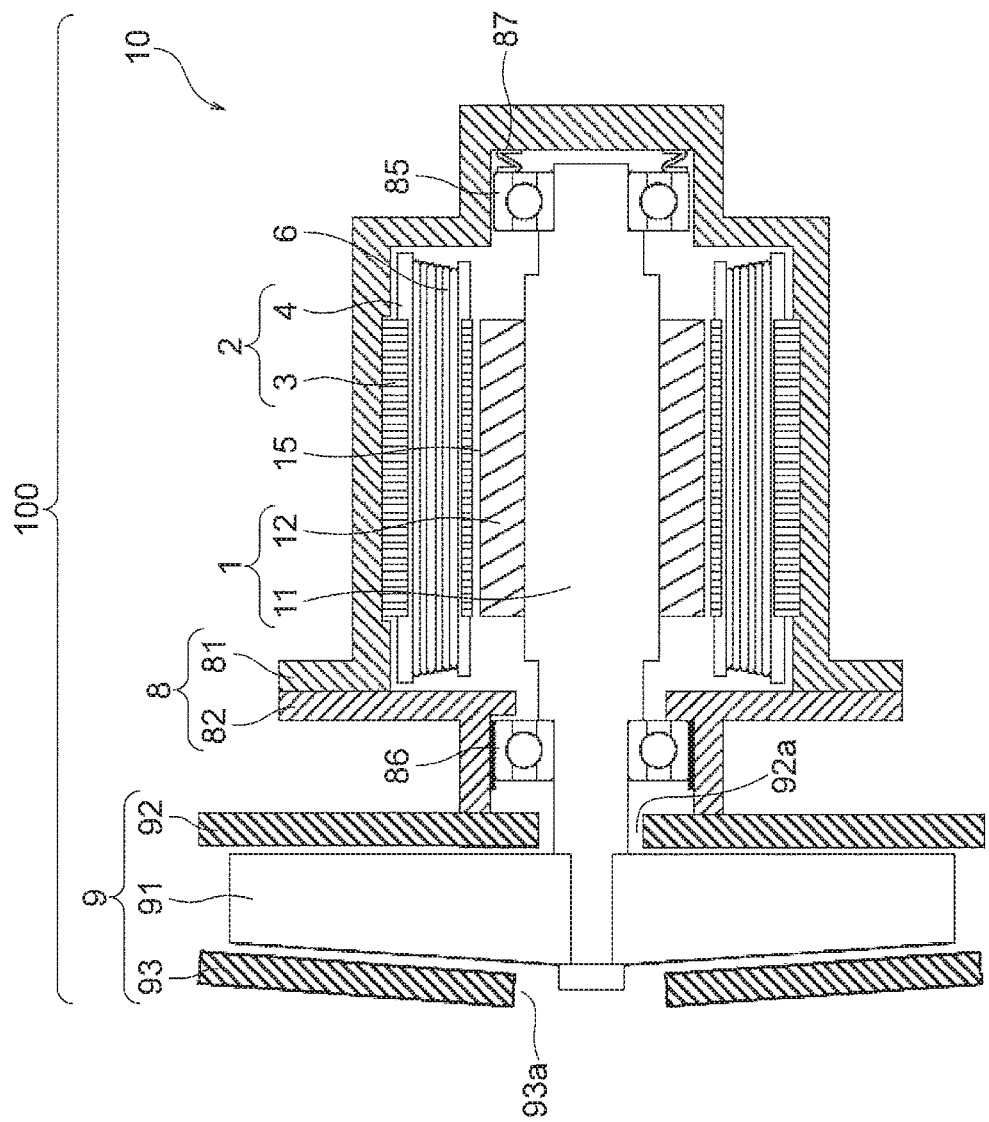
FIG. 19 is a cross-sectional view showing a configuration of a blower to which the motor in each of the embodiments is applicable.

Next, a blower 100 to which the motor in each of the embodiments described above is applied will be described. FIG. 19 is a cross-sectional view showing the blower 100 to which the motor in each of the embodiments is applied. The blower 100 is employed in a vacuum cleaner 200 (FIG. 20), for example. Here, the motor is described with the reference character 10 used in the first embodiment.

The blower 100 includes a main plate 92 attached to the second frame part 82 of the motor 10 and having a through hole 92a to be penetrated by the shaft 11, an impeller 91 attached to the tip end of the shaft 11 penetrating the through hole 92a of the main plate 92, and a fan cover 93 covering the impeller 91 from outside. The main plate 92, the impeller 91 and the fan cover 93 constitute a blower unit 9.

An air intake port 93a is formed at a center of the fan cover 93. A channel (air channel) for air flowing in through the air intake port 93a is formed between the main plate 92 and the fan cover 93.

When the rotor 1 of the motor 10 rotates, the impeller 91 attached to the shaft 11 of the rotor 1 rotates. As the impeller 91 rotates, air flows in through the air intake port 93a, flows in the air channel between the main plate 92 and the fan cover 93 toward the outer circumferential side, and is discharged through an air outlet (not shown) provided on the outer circumferential side.

Since this blower 100 employs the motor explained in each of the embodiments described above, a configuration of the blower 100 can be simplified and a manufacturing cost can be reduced. Further, stability of an operation of the blower 100 increases thanks to the enhancement in the accuracy of the attachment position of the Hall effect sensor 7.

(Vacuum Cleaner)

Figure 20:
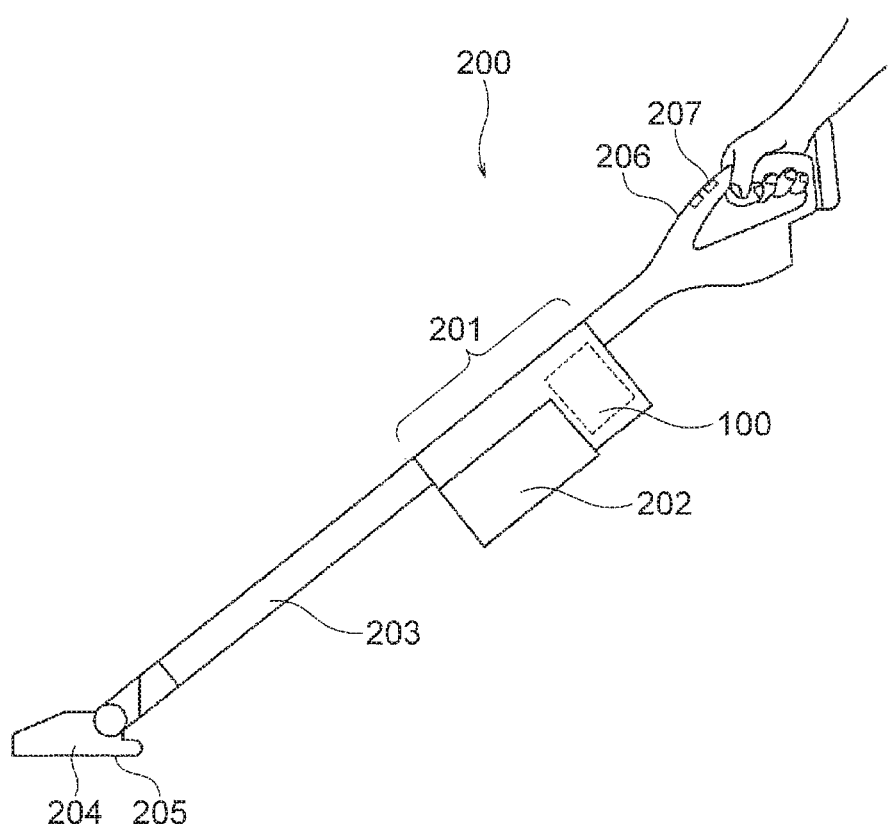
FIG. 20 is a cross-sectional view showing a configuration of a vacuum cleaner including the blower of FIG. 19.

Next, a vacuum cleaner 200 including the blower 100 to which the motor in each of the embodiments described above is applied will be described. FIG. 20 is a schematic diagram showing the vacuum cleaner 200 including the blower 100 to which the motor in each of the embodiments is applied.

The vacuum cleaner 200 includes a cleaner main body 201, a pipe 203 connected to the cleaner main body 201, and a suction part 204 connected to a tip end part of the pipe 203.

The suction part 204 is provided with a suction hole 205 for sucking in air containing dust. A dust collection container 202 is disposed in the cleaner main body 201.

Further, the blower 100 for sucking in air containing dust from the suction part 204 to the dust collection container 202 is disposed in the cleaner main body 201. The cleaner main body 201 is provided with a grip part 206 to be gripped by a user, and the grip part 206 is provided with an operation part 207 such as an on/off switch.

When the user grips the grip part 206 and operates the operation part 207, the blower 100 is activated. When the blower 100 is activated, suction wind occurs, and dust is sucked in together with air via the suction hole 205 and the pipe 203. The dust sucked in is stored in the dust collection container 202.

Since this vacuum cleaner 200 employs the motor explained in each of the embodiments described above, a configuration of the vacuum cleaner 200 can be simplified and a manufacturing cost can be reduced. Further, stability of an operation of the vacuum cleaner 200 increases thanks to the enhancement in the accuracy of the attachment position of the Hall effect sensor 7.

While preferred embodiments of the present invention have been described specifically above, the present invention is not limited to the above-described embodiments and a variety of improvements or modifications are possible within the range not departing from the subject matter of the present invention.

What is claimed is:

1. A stator comprising:
    a first split core having a first yoke part extending in a circumferential direction about an axis line and a first tooth extending from the first yoke part toward the axis line, the first tooth having a tip end part on a side opposite to the first yoke part;
    a second split core having a second yoke part extending in the circumferential direction and a second tooth extending from the second yoke part toward the axis line, the second tooth having a tip end part on a side opposite to the second yoke part;
    a first insulator arranged to surround the first tooth and having a first holding part;
    a second insulator arranged to surround the second tooth and having a second holding part; and
    a Hall effect sensor held by the first holding part and the second holding part,
    wherein the first holding part and the second holding part are located between the tip end part of the first tooth and the tip end part of the second tooth in the circumferential direction,
    wherein the first holding part has a first surface facing one of surfaces of the Hall effect sensor in the circumferential direction, and the second holding part has a second surface facing the other of the surfaces of the Hall effect sensor in the circumferential direction; and
    wherein at least one of the first holding part and the second holding part is configured to be resiliently deformable in the circumferential direction so that a distance between the first surface and the second surface is changeable.

2. The stator according to claim 1, wherein at least one of the first holding part and the second holding part has a first contact part contacting a surface of the Hall effect sensor on the axis line side.

3. The stator according to claim 1, wherein at least one of the first holding part and the second holding part has a second contact part contacting a surface of the Hall effect sensor on a side opposite to the axis line.

4. The stator according to claim 1, wherein a notch is formed in at least one of a part of the first insulator adjacent to the first holding part in the circumferential direction and a part of the second insulator adjacent to the second holding part in the circumferential direction.

5. The stator according to claim 1, wherein a distance between the first surface and the second surface is greater than a length of the Hall effect sensor in the circumferential direction.

6. The stator according to claim 1, wherein the first holding part extends to reach an end surface of the first insulator in a direction of the axis line, and
    wherein the second holding part extends to reach an end surface of the second insulator in the direction of the axis line.

7. A motor comprising a rotor and a stator provided around the rotor, wherein the stator comprises:
    a first split core having a first yoke part extending in a circumferential direction about an axis line and a first tooth extending from the first yoke part toward the axis line, the first tooth having a tip end part on a side opposite to the first yoke part;
    a second split core having a second yoke part extending in the circumferential direction and a second tooth extending from the second yoke part toward the axis line, the second tooth having a tip end part on a side opposite to the second yoke part;
    a first insulator arranged to surround the first tooth and having a first holding part;
    a second insulator arranged to surround the second tooth and having a second holding part; and
    a Hall effect sensor held by the first holding part and the second holding part,
    wherein the first holding part and the second holding part are located between the tip end part of the first tooth and the tip end part of the second tooth in the circumferential direction,
    wherein the first holding part has a first surface facing one of surfaces of the Hall effect sensor in the circumferential direction, and the second holding part has a second surface facing the other of the surfaces of the Hall effect sensor in the circumferential direction; and
    wherein at least one of the first holding part and the second holding part is configured to be resiliently deformable in the circumferential direction so that a distance between the first surface and the second surface is changeable.

8. A stator comprising:
    a first split core having a first yoke part extending in a circumferential direction about an axis line and a first tooth extending from the first yoke part toward the axis line, the first tooth having a tip end part on a side opposite to the first yoke part;
    a second split core having a second yoke part extending in the circumferential direction and a second tooth extending from the second yoke part toward the axis line, the second tooth having a tip end part on a side opposite to the second yoke part;
    a first insulator arranged to surround the first tooth and having a first holding part;
    a second insulator arranged to surround the second tooth and having a second holding part; and
    a Hall effect sensor held by the first holding part and the second holding part, wherein the first holding part and the second holding part are located between the tip end part of the first tooth and the tip end part of the second tooth in the circumferential direction, wherein a distance between the first surface and the second surface is greater than a length of the Hall effect sensor in the circumferential direction, and wherein at least one of the first surface and the second surface is inclined with respect to a direction of the axis line.

9. A stator comprising:

a first split core having a first yoke part extending in a circumferential direction about an axis line and a first tooth extending from the first yoke part toward the axis line, the first tooth having a tip end part on a side opposite to the first yoke part;

a second split core having a second yoke part extending in the circumferential direction and a second tooth extending from the second yoke part toward the axis line, the second tooth having a tip end part on a side opposite to the second yoke part;

a first insulator arranged to surround the first tooth and having a first holding part;

a second insulator arranged to surround the second tooth and having a second holding part; and a Hall effect sensor held by the first holding part and the second holding part, wherein the first holding part and the second holding part are located between the tip end part of the first tooth and the tip end part of the second tooth in the circumferential direction, wherein the Hall effect sensor has a trapezoidal shape in a cross section perpendicular to the axis line, and wherein the first holding part and the second holding part hold the Hall effect sensor so that the Hall effect sensor projects toward the axis line with respect to the first holding part and the second holding part.

10. A blower comprising:

the motor according to claim 7; and an impeller rotated by the motor.

11. A vacuum cleaner comprising a suction part having a suction hole, a dust collection container collecting dust, and a blower that sucks in air containing dust from the suction part to the dust collection container, wherein the blower comprises:

the motor according to claim 10; and an impeller rotated by the motor.

12. A method for attaching a Hall effect sensor, comprising the steps of:

preparing a first split core having a first yoke part and a first tooth having a tip end part on a side opposite to the first yoke part and a second split core having a second yoke part and a second tooth having a tip end part on a side opposite to the second yoke part;

attaching a first insulator to surround the first tooth and attaching a second insulator to surround the second tooth;

connecting the first split core and the second split core together in a circumferential direction about an axis line; and attaching a Hall effect sensor between a first holding part arranged in the first insulator between the tip end part of the first tooth and the tip end part of the second tooth and a second holding part arranged in the second insulator between the tip end part of the first tooth and the tip end part of the second tooth, wherein the first holding part has a first surface facing one of surfaces of the Hall effect sensor in the circumferential direction and the second holding part has a second surface facing the other of the surfaces of the Hall effect sensor in the circumferential direction;

wherein a distance between the first surface and the second surface is greater than a length of the Hall effect sensor in the circumferential direction;

wherein at least one of the first surface and the second surface is inclined with respect to a direction of the axis line; and wherein the step of attaching the Hall effect sensor comprises the steps of:

inserting the Hall effect sensor into between the first holding part and the second holding part in the direction of the axis line while monitoring output of the Hall effect sensor; and fixing the Hall effect sensor to the first holding part and the second holding part when the output of the Hall effect sensor reaches a reference value.

13. The method for attaching the Hall effect sensor according to claim 12, wherein an adhesive agent of an ultraviolet curing type is used in the step of attaching the Hall effect sensor.

* * * * *